(12) United States Patent
Barr et al.

(10) Patent No.: US 11,428,820 B1
(45) Date of Patent: Aug. 30, 2022

(54) METHOD TO DETERMINE AIRBORNE LIDAR INSTALLATION ANGLES USING GROUND RETURNS AND INS/GPS DATA

(71) Applicant: LOCKHEED MARTIN CORPORATION, Bethesda, MD (US)

(72) Inventors: Keith Stabler Barr, Erie, CO (US); Philip Gatt, Berthoud, CO (US); Derek Andrew Hutton, Golden, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 522 days.

(21) Appl. No.: 16/572,500

(22) Filed: Sep. 16, 2019

(51) Int. Cl.
| | | |
|---|---|---|
| *G01S 19/42* | (2010.01) | |
| *G01S 17/95* | (2006.01) | |
| *G01S 17/89* | (2020.01) | |
| *G01S 17/58* | (2006.01) | |
| *G06F 1/12* | (2006.01) | |
| *G05D 1/00* | (2006.01) | |
| *G05D 1/02* | (2020.01) | |
| *G01C 21/16* | (2006.01) | |

(52) U.S. Cl.
CPC ............ *G01S 17/95* (2013.01); *G01S 17/58* (2013.01); *G01S 17/89* (2013.01); *G01S 19/42* (2013.01); *G05D 1/0094* (2013.01); *G05D 1/0202* (2013.01); *G06F 1/12* (2013.01)

(58) Field of Classification Search
CPC ........ G01S 19/953; G01S 19/42; G01S 17/95; G01S 17/58; G01S 17/89; G01C 21/165; G05D 1/0094; G05D 1/0202
See application file for complete search history.

(56) References Cited

U.S. PATENT DOCUMENTS

| | | | |
|---|---|---|---|
| 9,007,570 B1 * | 4/2015 | Beyon | G01S 17/95 356/28 |
| 9,804,265 B2 * | 10/2017 | Kotake | G01S 17/42 |
| 10,527,724 B2 * | 1/2020 | Lodden | G01S 17/88 |
| 2009/0049905 A1 * | 2/2009 | LaWhite | G01S 17/95 73/170.13 |
| 2021/0319705 A1 * | 10/2021 | Furumoto | G08G 5/0034 |

* cited by examiner

*Primary Examiner* — Tan Q Nguyen
(74) *Attorney, Agent, or Firm* — BakerHostetler

(57) ABSTRACT

A system for determining airborne light detection and ranging (lidar) installation angles includes an airborne platform, a light detection and ranging (lidar) apparatus, a navigation system and a processor. The airborne platform performs a calibration flight in an orbit. The lidar apparatus is installed on the airborne platform for wind-velocity measurement. The navigation system is on board the airborne platform and measures motion data associated with movements of the airborne platform and generates a navigation signal. The processor determines in real time one or more installation angles of the lidar apparatus on the airborne platform to improve accuracy of the wind-velocity measurement.

20 Claims, 9 Drawing Sheets

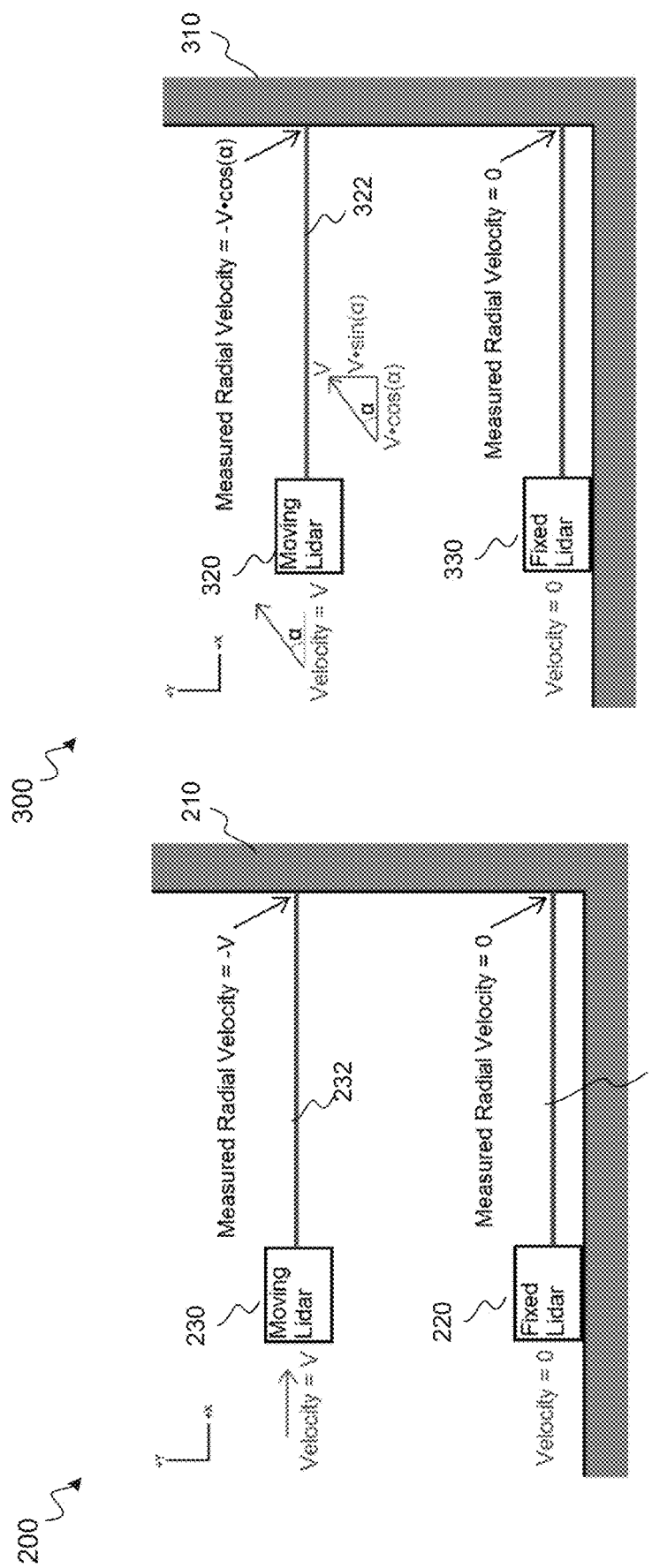

| Name | Dimensions | Source | Description |
|---|---|---|---|
| $[Aircraft\ Motion]$ | 1 x 3 for each LOS | Derived from the motion vector reported by the INS/GPS - KNOWN | One matrix for each LOS is a function of the aircraft motion components and is given by the INS/GPS. See equation 11. |
| $[R^{Local-Level}_{Aircraft}]$ | 3 x 3 for each LOS | Derived from attitude parameters reported by the INS/GPS - KNOWN | This transformation matrix converts from the aircraft frame to the local-level frame. One matrix for each LOS is a function of the aircraft attitude components and is given by the INS/GPS. See equation 24. |
| $[R^{Aircraft}_{Scan}]$ | 3 x 3 | Built using the presumed or intended installation angles of the lidar - KNOWN | This transformation matrix converts from the scan frame to the aircraft frame. One matrix exists that incorporates the presumed installation angles of the lidar system on the aircraft. See equation 25 |
| $[LOS^{Scan}]$ | 3 x 1 | These are the angles we are looking for - UNKNOWN | This matrix holds the unknown error rotations from the presumed installation angles. See equation 26. |
| $[Ground\ Velocity]$ | scalar for each LOS | Measured by the lidar system - KNOWN | This matrix defines the ground velocity measured for each LOS |

FIG. 5

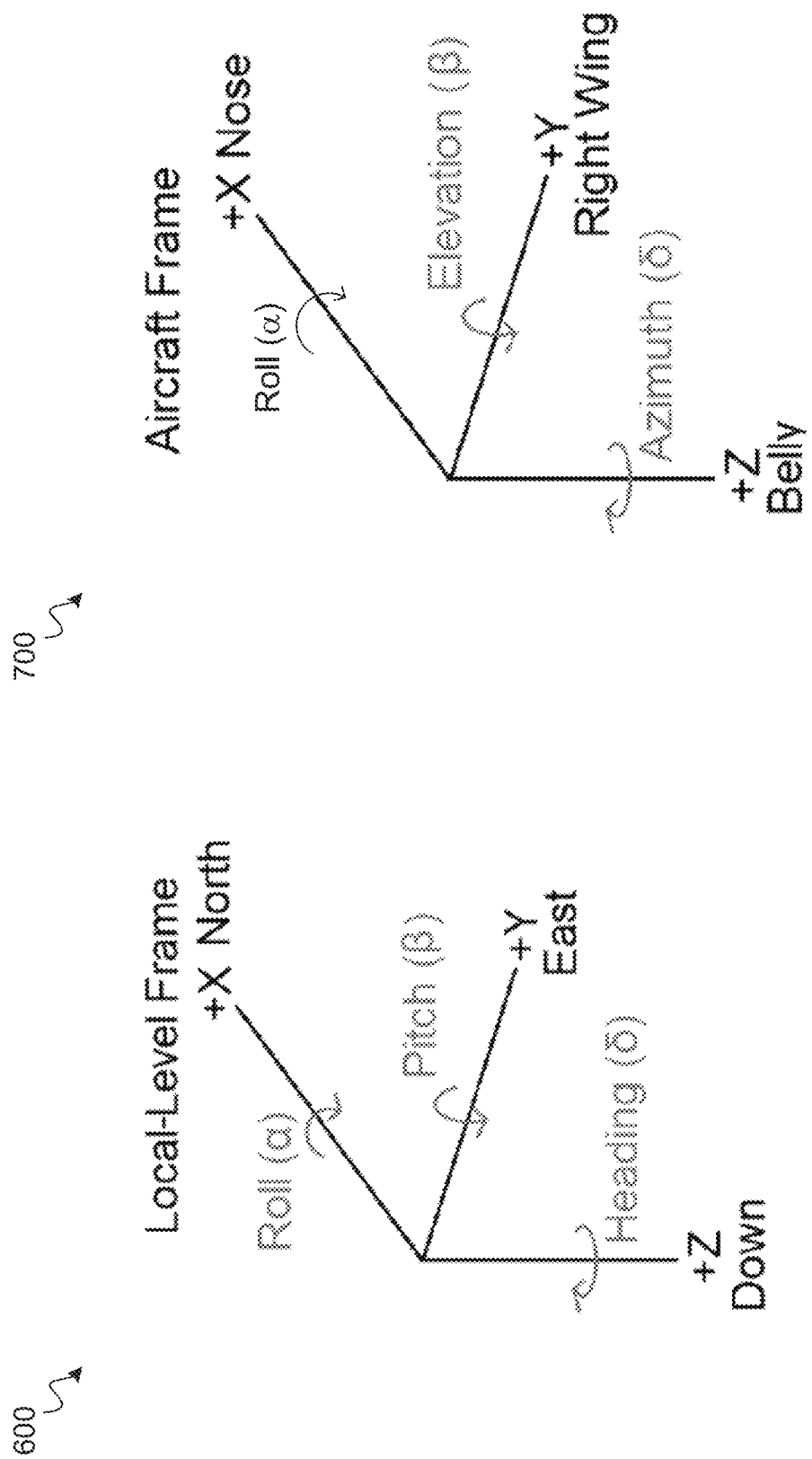

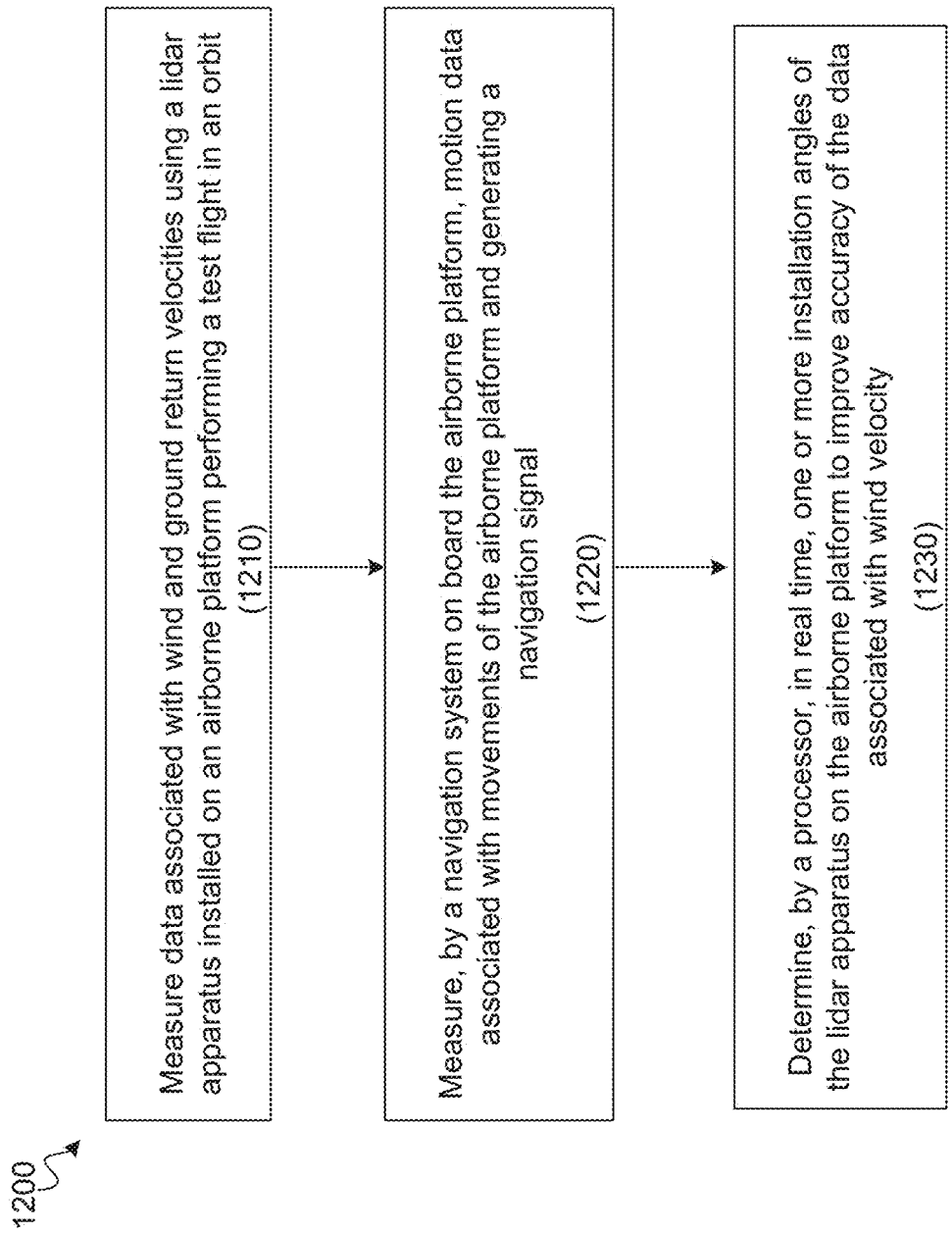

METHOD TO DETERMINE AIRBORNE LIDAR INSTALLATION ANGLES USING GROUND RETURNS AND INS/GPS DATA

STATEMENT REGARDING FEDERALLY SPONSORED RESEARCH OR DEVELOPMENT

This invention was made with government support under contract number GS05Q14BMD0001/GSG0517BM0238 ITSS ID05140018013 awarded by the United States government. The government has certain rights in this invention.

FIELD OF THE INVENTION

The present invention generally relates to photonic integrated circuits (PICs), and more particularly to a method to determine airborne light detection and ranging (lidar) installation angles using ground returns and inertial navigation system (INS) and/or global positioning system (GPS) data.

BACKGROUND

Doppler wind lidar is being investigated on numerous platforms to generate a three-dimensional airborne wind profile. The accuracy of results of such measurement can be affected by the aircraft motion and system alignment.

SUMMARY

According to various aspects of the subject technology, methods and configuration are disclosed for mitigating problems in light detection and ranging (lidar) wind measurements including aircraft motion and system alignment. The subject disclosure uses modern navigation (NAV) devices to obtain an accurate measurement of the aircraft motion and applies a mathematical solution to a single calibration flight of cloud-free data with NAV data.

In one or more aspects, a system for determining airborne lidar installation angles includes an airborne platform, a lidar apparatus, a navigation system and a processor. The airborne platform performs a test flight in an orbit. The lidar apparatus is installed on the airborne platform for wind-velocity measurement. The navigation system is on board the airborne platform and measures motion data associated with movements of the airborne platform and generates a navigation signal. The processor determines in real time one or more installation angles of the lidar apparatus on the airborne platform to improve accuracy of the wind velocity measurement.

In other aspects, a method includes measuring data associated with wind velocity using a lidar apparatus installed on an airborne platform performing a test flight in an orbit. The method further includes measuring, by a navigation system on board the airborne platform, motion data associated with movements of the airborne platform and generating a navigation signal. A processor is used to determine, in real time, one or more installation angles of the lidar apparatus on the airborne platform to improve accuracy of the data associated with wind velocity.

In yet other aspects, an airborne platform includes a lidar apparatus, a navigation system and a processor. The lidar apparatus facilitates wind-velocity measurement. The navigation system enables measuring motion data associated with movements of the airborne platform and generating a navigation signal. The processor determines in real time one or more installation angles of the lidar apparatus on the airborne platform to improve accuracy of the wind-velocity measurement, and further determines components of aircraft motions projected on a lidar beam based on the determined one or more installation angles of the lidar apparatus for an entire test flight.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 2 is a schematic diagram illustrating an example of a hard target lidar installation angles measurement framework for a moving and nonmoving lidar system, according to certain aspects of the disclosure.

FIG. 3 is a schematic diagram illustrating an example of motion generalized two-dimensional lidar installation angles measurement framework for a moving and nonmoving lidar system from moving and fixed platforms, according to certain aspects of the disclosure.

FIG. 5 is a table illustrating an explanation of matrices involved in a lidar installation angles determination, according to certain aspects of the disclosure.

FIG. 6 is a schematic diagram illustrating an example of local-level frame information for a three-dimensional (3-D) lidar installation angles determination, according to certain aspects of the disclosure.

FIG. 7 is a schematic diagram illustrating an example of an aircraft frame being used as a reference frame for a 3-D lidar installation angles determination, according to certain aspects of the disclosure.

FIG. 12 is a flow diagram illustrating an example method of lidar installation angles determination, according to certain aspects of the disclosure.

DETAILED DESCRIPTION

Figure 1:
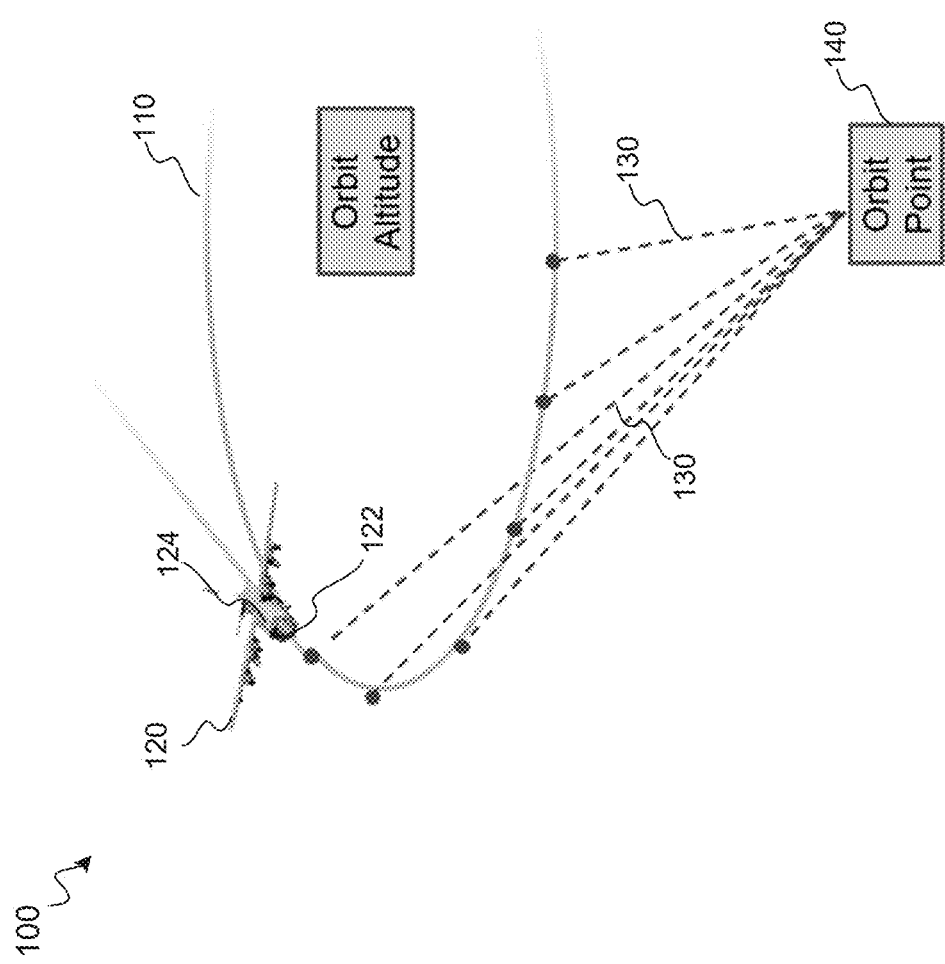
FIG. 1 is a conceptual diagram illustrating an example of a navigation test flight pattern for calibrating aircraft system alignment for lidar installation angles measurement, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the subject technology, methods and configurations are described for mitigating problems involving light detection and ranging (lidar) wind measurements including aircraft motion and system alignment. The subject disclosure can mitigate these problems using appropriate inertial navigation data and a single calibration test flight. To make accurate wind profile measurements, the disclosed solution determines the precise installation angles of an airborne lidar device (e.g., a Doppler lidar on the aircraft). By using the lidar itself, and by knowing the actual platform motion via an on-board inertial navigation system (INS) and/or global positioning system (GPS), the disclosed system automatically determines the installation angles from a single test (calibration) flight of cloud-free data for use on all future missions. The disclosed solution uses modern navigation (NAV) devices to obtain an accurate measurement of the aircraft motion, and a computer system connected to the lidar collects data and performs the required computations by applying a mathematical model to the single test flight data with NAV data.

Airborne lidar has shown the ability to measure wind profiles from airborne platforms. In order to achieve this accurately, the motion of the aircraft must be removed from the lidar return signal otherwise, the end result can be corrupted. To accurately remove the aircraft motion, the precise lidar installation angles need to be determined. Additionally, since signals from lidar and INS and/or GPS (INS/GPS) systems are to be used in this solution, both systems are to be time calibrated and any offsets between the two signals are to be removed.

The disclosed solution defines a mathematical algorithm for performing these corrections. These corrections are important because, if the actual installation angles of the lidar apparatus on the aircraft are not known, the lidar ground returns must be used to calibrate the data. This can lead to two problems. First, the ground must be visible, so line-of-sight (LOS) of data without ground returns, such as those blocked by clouds, are not usable. Second, and more importantly, if the exact installation angles are not known, it is impossible to generate an accurate wind profile without this algorithm, and only approximations of the profile are possible, with errors related directly to the difference between the actual and assumed installation angles. Once the accurate installation angles of the lidar apparatus on the aircraft are known, the accurate INS/GPS data can be used to generate accurate wind profiles for corresponding cases.

Modern NAV devices can provide an accurate measurement of the component of aircraft motion coincident with the LOS, if the installation angles of the lidar equipment are known with a rather high accuracy.

FIG. 1 is a conceptual diagram illustrating an example of a navigation test flight pattern 100 for calibrating aircraft system alignment for lidar installation angles measurement, according to certain aspects of the disclosure. The mathematical approach of the subject technology can address the system alignment by using the test flight pattern 100, as shown in FIG. 1. The test flight pattern 100 involves a simple orbit 120, at an orbit altitude and with an orbit point 140, and is covered by an aircraft 120 carrying the lidar 122, with the lidar beam intersecting the ground without requiring any scanner. The aircraft 120 is equipped with a navigation system 124 including high-accuracy INS/GPS systems, and one or more onboard processors (e.g., of a computer system) are connected to the lidar 122 to collect data and to the INS/GPS systems to collect navigation data and perform the required computations. The lidar system formed of the aircraft 120, the lidar 122, the INS and GPS systems and the onboard processor can perform regularly spaced measurements of radial wind-velocity data, along a single LOS (e.g., 130), which is collected in a known orientation. Radial winds are the components of the atmospheric wind vector, which is aligned with and parallel to the lidar beam. By combining multiple LOS measurements, the three-dimensional wind profile can be determined.

The test flight would require clear skies such that ground returns could be observed in the lidar data stream. Ideally the aircraft 120 would enter an orbit (e.g., 110) that would allow ground returns to be observed. More data collection will yield a better result, but the system has been successfully demonstrated using data collected over 5,000 individual LOSs, which may typically represent about 90 minutes of data collection.

When an LOS of data is collected from a nonmoving platform, such as a fixed ground-based system, the radial velocity measurements contain only information directly from the atmospheric wind. In a moving platform, however, such as the aircraft 120, the component of motion of the platform that is aligned with the lidar beam and the atmospheric wind both contribute to the measured radial velocity. To measure wind accurately, the aircraft motion must be removed from the radial wind measurement prior to using the data for wind-profile generation. It is understood, however, that simply removing the INS/GPS reported aircraft motion from the radial wind measurements does not provide the required accuracy due to an error between the presumed and actual lidar installation angles.

The present disclosure describes a system (aircraft, lidar, INS/GPS, and processor for real-time processing) that can compute the actual lidar installation angles. The computed actual lidar installation angles can dramatically improve the wind-profile measurement accuracy and allows other benefits that expand the usefulness of airborne lidar in general.

Historically, the conventional method of removal of the aircraft motion from the LOS data is by measuring the hard-target ground return radial velocity (which contains only the aircraft motion since the ground is not moving) and subtracting its value from each radial wind measurement in the LOS. While this method provided reasonable accuracy, it severely limited the usefulness of airborne lidar, because a ground return was required to be found in every LOS of data to remove the aircraft motion from it. If a ground return was not measured (because of cloud blockage, aircraft attitude, or lidar range limitations), the entire LOS was not useful and would be discarded.

According to aspects of the subject technology, a single set of data with ground returns is used to provide actual installation angles to be used for all future missions. This allows the use of the INS/GPS data to remove aircraft motion from the LOS and eliminates the need for a ground return to be found. Thus, the subject technology can dramatically increase the usefulness of airborne Doppler lidar by enabling the lidar system to make accurate radial velocity measurements regardless of cloud cover, aircraft attitude or lidar range capabilities.

In some implementations, presumed LOS alignment angles can be determined for the test flight pattern configuration in two steps. In the first step, using the presumed installation angles, the components of aircraft motion projected on the lidar beam are computed. For the complete flight test, both the variation of the NAV component and lidar ground return signals can be approximated with sine waves. A cross-correlation and a parabolic fit of the two sine waves can be performed to determine any time offset between the two signals, which can then be used to correct the NAV data. In a second step, using the time-corrected NAV data and the ground return data and realizing that the two sine waves should be identical, a least-squares fit can be found that identifies the installation angles with an acceptable accuracy.

In some implementations, the subject technology solves two problems, the first being removal of time offsets between the INS/GPS system and the lidar data system signals, and the second being determination of the lidar installation angle. The first problem is solved using a cross-correlation technique, the result of which is fitted to a parabola that gives a precise (noninteger) time offset solution. The second problem can be solved via a novel linear-algebra solution where initial values for installation angles are assumed, and corrections to that assumption are determined mathematically.

It is to be noted that existing solutions use ground returns to calibrate return signals, which results in the ground return requirement imposed and declining accuracy. The disclosed solution herein allows the calibration to be completed using ground returns and GPS/INS data that eliminates the need for ground returns being visible in the lidar data stream after the calibration, thereby allowing operation in cloudy conditions and improving overall wind-profile accuracy. The elimination of the ground visibility requirement allows lidar to be a significantly more useful airborne wind profile generator in real-world conditions.

FIG. 2 is a schematic diagram illustrating an example of a hard-target lidar installation angles measurement framework 200 for a moving and nonmoving lidar system, according to certain aspects of the disclosure. The data collected by the lidar system, as described with respect to FIG. 1, is analyzed as explained herein, to produce the best estimates of the actual installation angles. These angles can then be entered into a normal wind-profile generation software to allow the removal of aircraft motion from the LOS data using only INS/GPS-provided aircraft motion data.

To gain a better understanding of the three-dimensional process described in the present disclosure, it would be prudent to begin with a two-dimensional description of the background information on lidar and to see the way a platform motion can affect measurements. As shown in the framework 200, when the LOS 222 of a nonmoving ground-based (fixed) lidar 220 intersects a nonmoving target 210, such as a wall or the ground, a radial velocity of zero is observed (measured). Similarly, a moving lidar 230 is able to detect platform (e.g., aircraft) motion along an LOS 232 when reflecting off the nonmoving target 210. One point to note is the measured radial velocity (V) is negated. The reason stems from the standard reporting of radial velocity where a negative velocity indicates movement toward the lidar (e.g., 230) and a positive velocity indicates movement away from the lidar. In FIG. 2, the relative motion of the wall (e.g., 210) is toward the lidar 230, hence the negative value. The situation shown in FIG. 2 may be somewhat contrived, as the motion of the moving lidar platform is perfectly aligned with the direction of the LOS 232.

FIG. 3 is a schematic diagram illustrating an example of a motion generalized two-dimensional lidar installation angles measurement framework 300 for a moving and nonmoving lidar system from moving and fixed platforms, according to certain aspects of the disclosure. The framework 300 shows a slightly more generalized version of the framework 200 of FIG. 2, in the sense that the motion of the lidar 320 is not aligned with the LOS 322. The important point in the framework 300 is that the measured hard-target radial velocity is simply the component (in the opposite sense) of the motion of the platform that is aligned with the LOS 322, which can be expressed as $V \cdot \cos(\alpha)$ with a negative sign.

Figure 4:
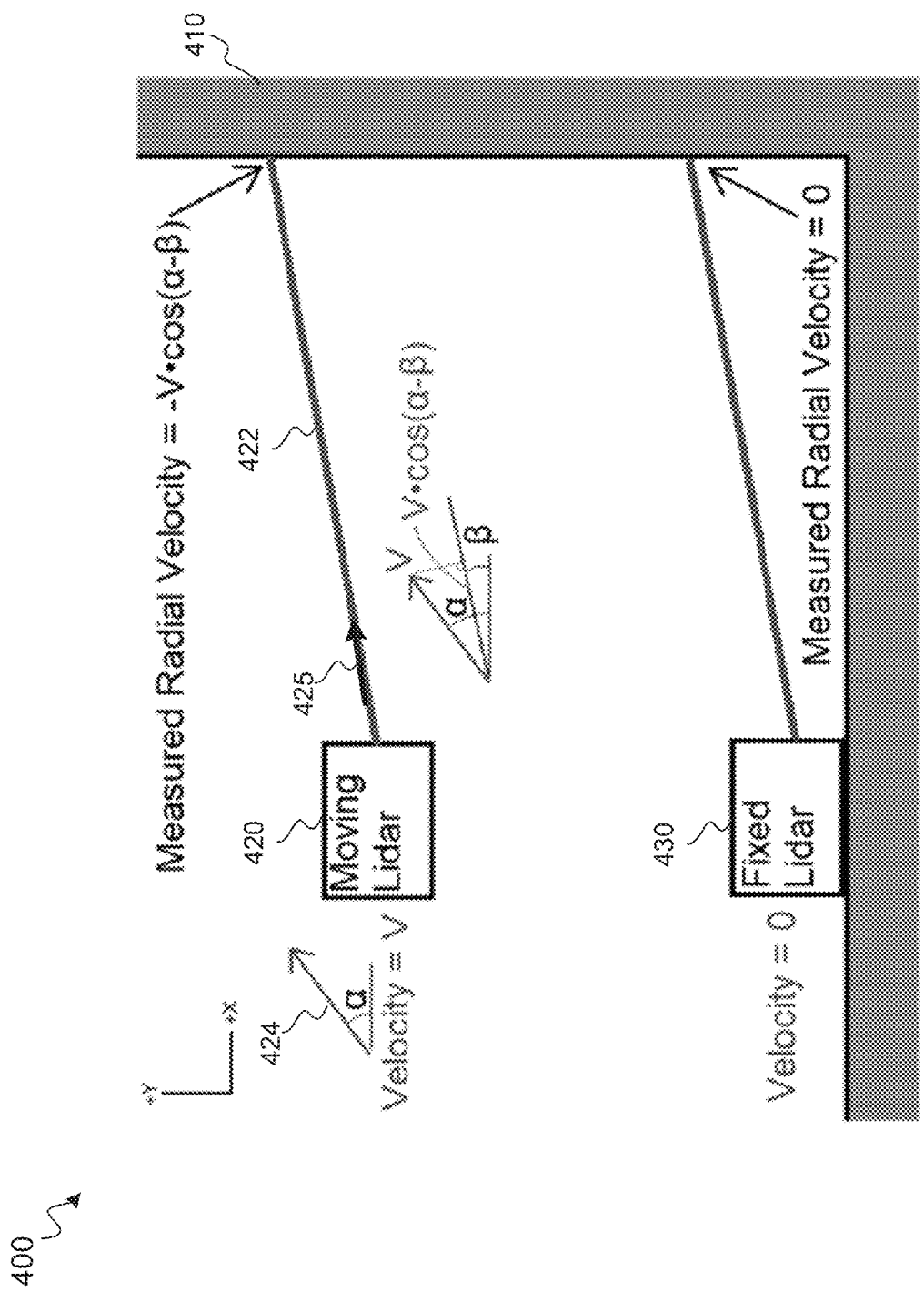
FIG. 4 is a schematic diagram illustrating an example of a framework similar to the framework of FIG. 3 with an addition of an unknown lidar installation angle ($\beta$), according to certain aspects of the disclosure.

FIG. 4 is a schematic diagram illustrating an example framework 400 similar to the framework 300 of FIG. 3 with the addition of an unknown lidar installation angle ($\beta$), according to certain aspects of the disclosure. The framework 400 is a more generalized version of the framework 300, in which a somewhat unknown parameter, lidar installation angle ($\beta$), is included. The framework 400 is a fully generalized two-dimensional case that shows the effects of the radial velocity as well. For a fixed lidar 430, the measured radial velocity from a nonmoving target 410 is zero. For a moving lidar 420, with the lidar installation angle $\beta$, the measured hard-target radial velocity, G, can be expressed as:

$$V \cdot \cos(\alpha - \beta) = -G \quad \text{(Eq. 1)}$$

That can be expanded as follows:

$$V \cdot \cos\alpha \cdot \cos\beta + V \cdot \sin\alpha \cdot \sin\beta = -G \quad \text{(Eq. 2)}$$

The two terms of the right side of Eq. 2 can be interpreted as the projection of the aircraft motion with velocity V and direction $\alpha$ onto the LOS 422 with direction $\beta$. The dot product of two vectors (in this case, the motion vector 424 and the LOS unit vector 425) allows computing the value of G.

FIG. 5 is Table 500 illustrating an explanation of matrices involved in a lidar installation angles determination, according to certain aspects of the disclosure. The matrices in Table 500 are used in a matrix approach for solving Eq. 2 for the lidar installation angle ($\beta$), as explained herein. Starting with a dot product equation:

$$A \cdot B = |A||B| \cos\theta \quad \text{(Eq. 3)}$$

which can be expressed as:

$$A \cdot B = \begin{bmatrix} A_i & A_j \end{bmatrix} \cdot \begin{bmatrix} B_i \\ B_j \end{bmatrix} = A_i B_i + A_j B_j \quad \text{(Eq. 4)}$$

Note the right side of Eq. 3 is the same form as the left side of Eq. 1 (the magnitude of the LOS unit vector is simply 1), where θ is (α−β) and the right side of Eq. 4 is similar to the left side of Eq. 2. Factoring Eq. 2 in the form of Eq. 4 results in:

$$[V \cdot \cos\alpha \ \ V \cdot \sin\alpha] \cdot \begin{bmatrix} \cos\beta \\ \sin\beta \end{bmatrix} = -\text{Radial Velocity}_{Ground} \quad \text{(Eq. 5)}$$

In Eq. 5, the unknown installation angle (β) is now contained in a single matrix that can be simplified to:

$$[\text{Aircraft Motion}] \cdot [LOS] = -[\text{Ground Velocity}] \quad \text{(Eq. 6)}$$

The last two equations (Eq. 5 and Eq. 6) are the final and complete two-dimensional equations showing the relationship between platform (aircraft) motion and measured radial velocity (ground velocity) for a single frame of reference. So the problem is reduced to one equation and one unknown that can be easily solved. It should be noted, however, that the parameters V, α and G are all measurements, not exact values, and as a result they can have measurement errors in their reported values. If only one measurement were used to identify the lidar installation angle (β), an exact solution would be expected for that single case, but most likely the single solution would not be the most accurate general solution. To attain an accurate solution, multiple measurements need to be performed and the collected measurement results combined in the form of Eq. 6 into a single large matrix equation as:

$$\begin{bmatrix} \text{Aircraft Motion}_1 \\ \vdots \\ \text{Aircraft Motion}_N \end{bmatrix} \cdot [LOS] = -\begin{bmatrix} \text{Ground Velocity}_1 \\ \vdots \\ \text{Ground Velocity}_N \end{bmatrix} \quad \text{(Eq. 7)}$$

where each Aircraft Motion vector is:

$$\text{Aircraft Motion}_n = [V_n \cos\alpha_n \ \ V_n \sin\alpha_n]$$

and each Ground Velocity is simply a scalar:

$$\text{Ground Velocity}_n = \text{Radial Velocity}_{Ground,n}$$

Checking the dimensions of the matrices shows a valid matrix statement (where N is the number of measurements:

$$[N \times 2] \cdot [2 \times 1] = -[N \times 1]$$

It is noted that Eq. 7 can be solved for the unknowns using linear algebra and a least-squares regression. To simplify the notation, the Aircraft Motion matrix can be represented as H and the Ground Velocity matrix as G, so Eq. 7 becomes:

$$[H] \cdot [LOS] = -[G] \quad \text{(Eq. 8)}$$

Beginning the process of solving for [LOS], each side of Eq. 8 can be multiplied by the transpose of [H]:

$$[H]^T \cdot [H] \cdot [LOS] = -[H]^T [G]$$

It is known that multiplying the inverse of a matrix by itself results in the identity matrix, [I]. This idea can be used to isolate the LOS matrix:

$$[[H]^T[H]]^{-1} \cdot [[H]^T[H]] \cdot [LOS] = -[[H]^T[H]]^{-1} \cdot [H]^T \cdot [G]$$

Simplifying the first term to the identity matrix, the final solution would be:

$$[LOS] = -[[H]^T[H]]^{-1}[H]^T[G] \quad \text{(Eq. 9)}$$

By solving the right side of Eq. 9, the result is a 2×1 matrix. From Eq. 5 and Eq. 6

$$[LOS] = \begin{bmatrix} \cos\beta \\ \sin\beta \end{bmatrix}$$

and either member can be used to solve for the unknown lidar installation angle β.

In summary, for the two-dimensional case, the matrix [H] can be determined by performing a set of platform (aircraft) motion measurements using an onboard INS and/or GPS and a set of ground return radial velocities ([G]) and using Eq. 9 to solve for lidar installation angle values ([LOS]) using a least squares estimation. In the following, the three-dimensional case is analyzed.

Moving from the above contrived two-dimensional analysis to a more realistic three-dimensional (3-D) version adds some complexity to the individual matrices, but Eq. 9 remains fully valid. There are two main complications that can arise in the three-dimensional airborne case. The first is moving from being able to define a vector with a magnitude and a single angle defining the direction to specifying the magnitude and two angles defining the orientation. This change adds a third term to the matrices (2×1 becomes 3×1, etc.), but the additional term is easily handled in the matrix mathematics and is essentially of no consequence. The second complication is due to dealing with multiple coordinate frames in an aircraft environment, and the need to derive and apply transfer matrices to convert from one frame to another. Other than these two issues, the solution of the problem is identical to that shown in the derivation of Eq. 9. The following is aimed at understanding the multiple reference frames and the derivation of the transfer matrices required to solve the three-dimensional problem.

There are three reference frames to be concerned with: the scanner frame, the aircraft frame, and the local-level frame. The scanner frame is referenced to the lidar itself, which is installed on the aircraft; this is the frame in which the unknown installation angles are captured. The aircraft frame is referenced to the aircraft itself; this is the frame in which the presumed and/or intended lidar installation angles are captured. The local-level frame is referenced to the Earth at the current aircraft position; this frame contains aircraft motion and attitude. Going back to Eq. 6, with the three-dimensional aircraft problem at hand, transformation matrices need to be added in to convert the LOS vector (which contains the unknown installation angles) from scan coordinates to aircraft coordinates, and a second transformation to convert from aircraft coordinates to local-level frame coordinates. The complete equation, with transfer matrices, is:

$$[\text{Aircraft Motion}] \cdot [R_{Aircraft}^{Local-Level}] \cdot [R_{Scan}^{Aircraft}] \cdot [LOS^{Scan}] = \quad \text{(Eq. 10)}$$
$$-[\text{Ground Velocity}]$$

In Eq. 10, the transfer matrices are designated as R with the subscript specifying the frame it converts from and the superscript denoting the frame it converts to, and $LOS^{Scan}$ represents the LOS matrix in the scanner frame. A summary of each matrix in Eq. 10 is provided in Table 500, which is self-explanatory. Once Eq. 10 is populated based on the information of Table 500, it can be simplified down to the same form as shown in Eq. 8 by combining the three known matrices. It can then be solved using the format shown in Eq. 10. Once this is completed, the actual installation angles of the lidar system on the aircraft are determined. The presumed installation angles can be updated, and the aircraft motion can be removed from the radial wind velocities using INS/GPS data alone.

FIG. 6 is a schematic diagram illustrating an example of local-level frame 600 information for 3-D lidar installation angles determination, according to certain aspects of the disclosure. The INS and/or GPS measurements report aircraft motion in the local-level frame 600, defined as shown in FIG. 6. The local-level frame 600 is Earth-justified based on the position of the aircraft. The X-Y plane is tangent to the surface of the Earth, with the positive X-axis pointing North, the positive Y-axis pointing East, and the positive Z-axis pointing down to preserve the normal right-handed coordinate system. The INS/GPS provides aircraft motion component velocities in the North-East-Down frame of FIG. 6. The INS/GPS also provides the aircraft attitude or rotations about the local-level frame coordinate system that provides the information necessary to convert (via a transformation matrix) from the aircraft frame to the local-level frame. The INS/GPS rotations are taken in the order of heading ($\delta$), pitch ($\beta$), and then roll ($\alpha$). The order of rotation is important and cannot be changed. Each member of the Aircraft Motion matrix is given directly by the INS/GPS as shown in:

[Aircraft Motion]=[North Velocity East Velocity Down Velocity] (Eq. 11)

FIG. 7 is a schematic diagram illustrating an example of an aircraft frame 700 for being used as a reference frame for a 3-D lidar installation angles determination, according to certain aspects of the disclosure. The aircraft frame 700 as defined in FIG. 7 moves as the aircraft does. The positive X-axis points forward out the nose of the aircraft, the positive Y-axis points out the right wing, and the positive Z-axis points down through the belly to preserve a normal right-handed coordinate system. Equipment installed on the aircraft can describe its alignment to the aircraft through rotations about the aircraft frame axes, first by applying azimuth ($\delta$), then by applying elevation ($\beta$). The order of rotation is important and cannot be changed. To convert from the aircraft frame to the local-level frame, transformation matrices are to be derived.

To convert from the local-level frame 600 of FIG. 6 to the aircraft frame 700, each rotation has to be analyzed individually. For example, heading is considered first, then pitch and then roll.

Figure 8:
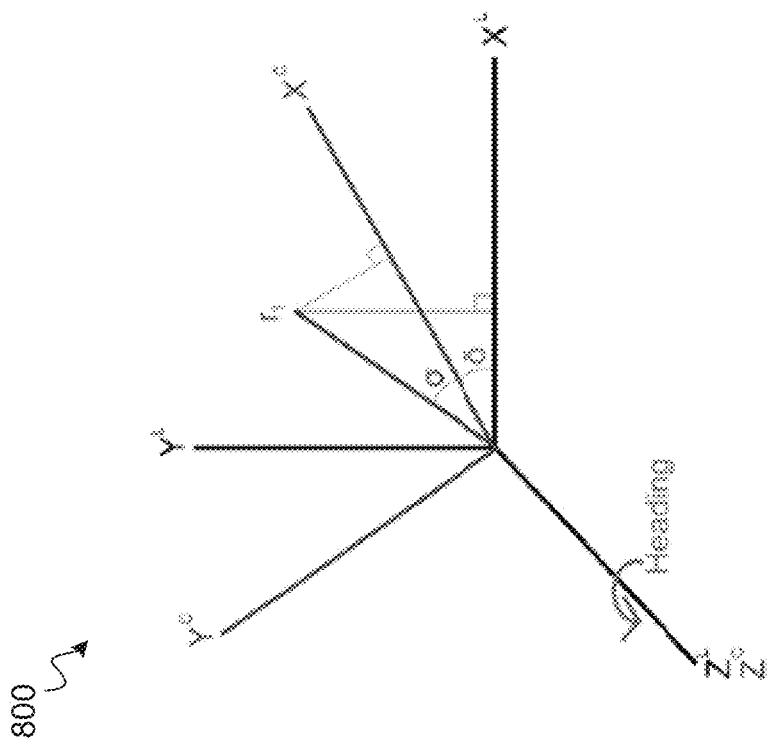
FIG. 8 is a schematic diagram illustrating an example of a framework for converting from the local-level frame to an intermediate aircraft frame with a heading rotation, according to certain aspects of the disclosure.

FIG. 8 is a schematic diagram illustrating an example of a framework 800 for converting from the local-level frame, L, to the intermediate aircraft frame with a heading rotation, C, according to certain aspects of the disclosure. The first rotation (heading) is about the Z-axis and is shown in FIG. 8. In this example, $r_1$ is the projection of r onto the X-Y plane. The components for the projected unit vector in both the local-level frame (L) and the intermediate frame (C) are expressed as:

$X^L = r_1 \cos(\sigma+\delta)$ $Y^L = r_1 \sin(\sigma+\delta)$ $Z^L = Z^C$ (Eqs. 12)

and $X^C = r_1 \cos \sigma$ $Y^C = r_1 \sin \sigma$ $Z^C = 0$ (Eqs. 13)

Now Eqs. 12 are expanded, using the Ptolemy Identities, and Eqs. 13 are substituted to obtain:

$X^L = r_1 \cos(\sigma+\delta) = r_1 \cos \sigma \cos \delta - r_1 \sin \sigma \sin \delta = X^C \cos \delta - Y^C \sin \delta$ $Y^L = r_1 \sin(\sigma+\delta) = r_1 \sin \sigma \cos \delta + r_1 \cos \sigma \sin \delta = X^C \sin \delta + Y^C \cos \delta$ $Z^L = Z^C$ (Eqs. 14)

Finally, the right side of Eqs. 14 is converted into a matrix form to attain the transfer matrix from intermediate frame C to the local-level frame:

$$\begin{bmatrix} X^L \\ Y^L \\ Z^L \end{bmatrix} = \begin{bmatrix} \cos\delta & -\sin\delta & 0 \\ \sin\delta & \cos\delta & 0 \\ 0 & 0 & 1 \end{bmatrix} \cdot \begin{bmatrix} X^C \\ Y^C \\ Z^C \end{bmatrix}$$ (Eq. 15)

$$R_C^L = \begin{bmatrix} \cos\delta & -\sin\delta & 0 \\ \sin\delta & \cos\delta & 0 \\ 0 & 0 & 1 \end{bmatrix}$$

Figure 9:
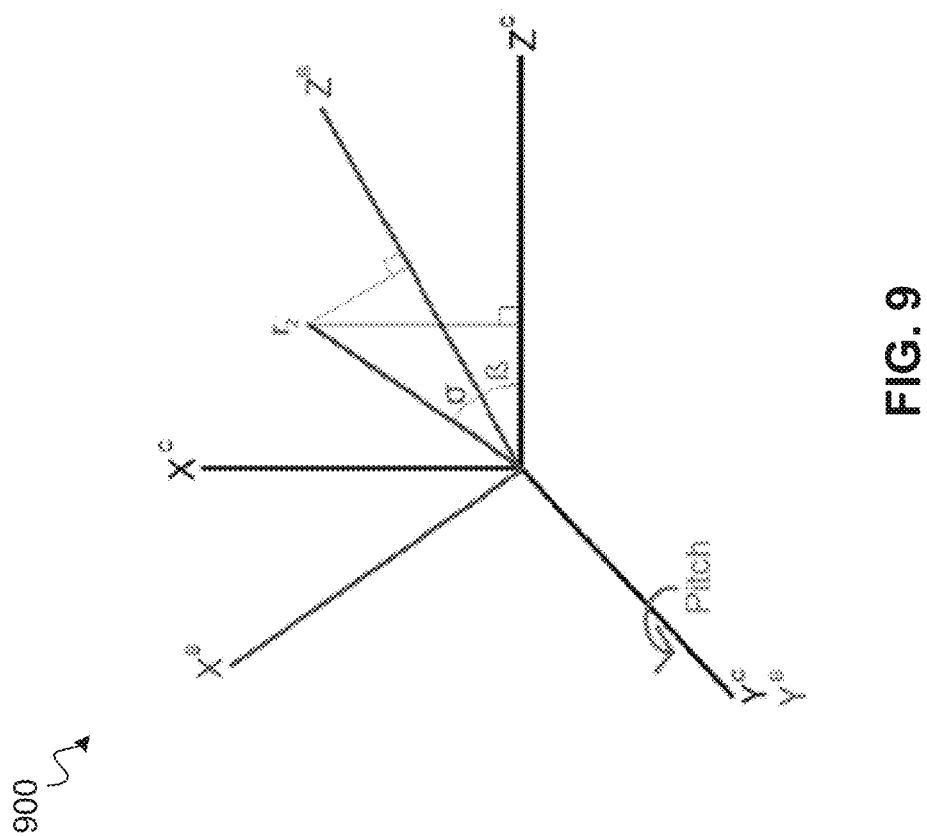
FIG. 9 is a schematic diagram illustrating an example of a framework for converting from an intermediate aircraft frame with heading rotation to the intermediate aircraft frame with a heading and pitch rotations, according to certain aspects of the disclosure.

FIG. 9 is a schematic diagram illustrating an example of a framework 900 for converting from the intermediate frame C to the intermediate frame B with a pitch rotation, according to certain aspects of the disclosure. The second rotation is about the Y-axis (pitch) and is shown in the framework 900 of FIG. 9. In this example, $r_2$ is the projection of r onto the X-Z plane. First, the components for the projected unit vector in both the intermediate frame (C) and the intermediate frame (B) are found:

$X^C = r_2 \sin(\sigma+\beta)$ $Y^C = Y^B$ $Z^C = r_2 \cos(\sigma+\beta)$ (Eqs. 16)

and $X^B = r_2 \sin \sigma$ $Y^B = 0$ $Z^B = r_2 \cos \sigma$ (Eqs. 17)

Now, Eqs. 16 are expanded by using the Ptolemy Identities, and Eqs. 17 are substituted to find:

$X^C = r_2 \sin(\sigma+\beta) = r_2 \sin \sigma \cos \beta + r_2 \cos \sigma \sin \beta = X^B \cos \beta + Z^B \sin \beta$ $Y^C = Y^B$ $Z^C = r_2 \cos(\sigma+\beta) = r_2 \cos \sigma \cos \beta - r_2 \sin \sigma \sin \beta = -X^B \sin \beta + Z^B \cos \beta$ (Eqs. 18)

Finally, the right side of Eqs. 18 is converted into a matrix form to find the transfer matrix from intermediate frame B to intermediate frame C:

$$\begin{bmatrix} X^C \\ Y^C \\ Z^C \end{bmatrix} = \begin{bmatrix} \cos\beta & 0 & \sin\beta \\ 0 & 1 & 0 \\ -\sin\beta & 0 & \cos\beta \end{bmatrix} \cdot \begin{bmatrix} X^B \\ Y^B \\ Z^B \end{bmatrix}$$

Figure 10:
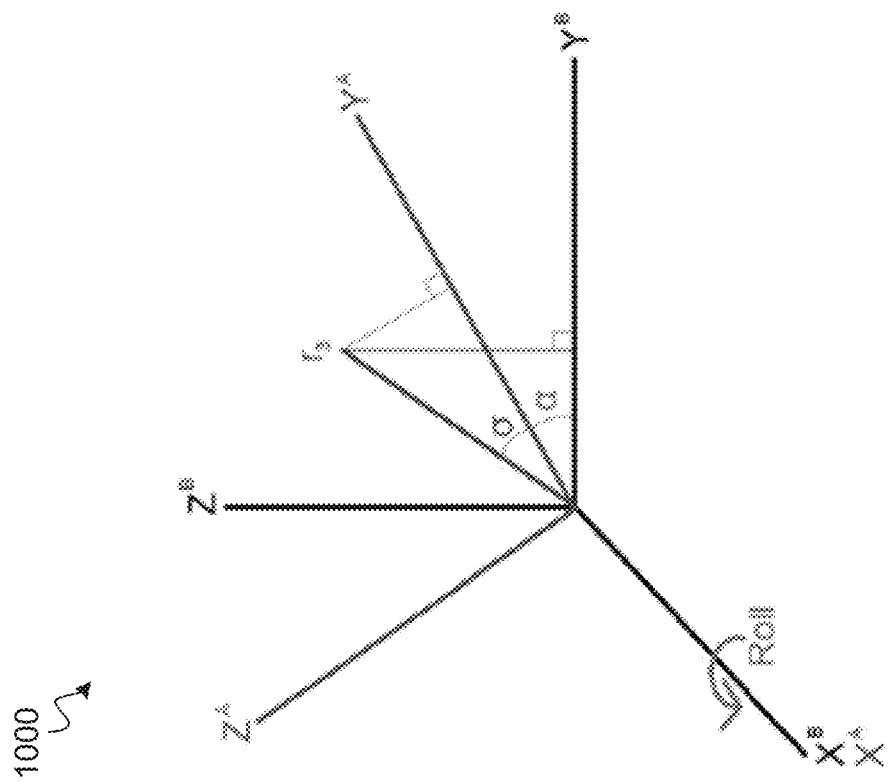
FIG. 10 is a schematic diagram illustrating an example of a framework for converting from the intermediate aircraft frame with heading and pitch rotations frame to the aircraft frame with a heading, pitch, and roll rotations, according to certain aspects of the disclosure.

FIG. 10 is a schematic diagram illustrating an example of a framework 1000 for converting from the intermediate frame B to the intermediate frame A with a roll rotation, according to certain aspects of the disclosure. The final rotation is about the X-axis (roll) and is shown in framework 1000 of FIG. 10. In this example, $r_3$ is the projection of r onto the Y-Z plane. First, the components for our projected unit vector in both the intermediate frame (B) and the aircraft frame (A) are found:

$X^B = X^A$ $Y^B = r_3 \cos(\sigma+\alpha)$ $Z^B = r_3 \sin(\sigma+\alpha)$ (Eqs. 20)

and $X^A = 0$ $Y^A = r_3 \cos \sigma$ $Z^A = r_3 \sin \sigma$ (Eqs. 21)

Now, by expanding Eqs. 20 using the Ptolemy Identities and substituting Eqs. 21, one arrives at:

$X^B = X^A$ $Y^B = r_3 \cos(\sigma+\alpha) = r_3 \cos \sigma \cos \alpha - r_3 \sin \sigma \sin \alpha = Y^A \cos \alpha - Z^A \sin \alpha$ $Z^B = r_3 \sin(\sigma+\alpha) = r_3 \sin \sigma \cos \alpha + r_3 \cos \sigma \sin \alpha = Y^A \sin \alpha + Z^A \cos \alpha$ (Eqs. 22)

Finally, the right side of Eqs. 22 is converted into a matrix form to find the transfer matrix from intermediate frame B to intermediate frame C:

$$\begin{bmatrix} X^B \\ Y^B \\ Z^B \end{bmatrix} = \begin{bmatrix} 1 & 0 & 0 \\ 0 & \cos\alpha & -\sin\alpha \\ 0 & \sin\alpha & \cos\alpha \end{bmatrix} \cdot \begin{bmatrix} X^A \\ Y^A \\ Z^A \end{bmatrix}$$ (Eq. 23)

$$R_A^B = \begin{bmatrix} 1 & 0 & 0 \\ 0 & \cos\alpha & -\sin\alpha \\ 0 & \sin\alpha & \cos\alpha \end{bmatrix}$$

Now, by combining Eqs. 15, 19, and 23, the full transfer matrix from the aircraft frame to the local-level frame can be created as:

$$R_{Aircraft}^{Local-Level} = \begin{bmatrix} X^L \\ Y^L \\ Z^L \end{bmatrix} =$$ (Eq. 24)

$$\begin{bmatrix} \cos\delta & -\sin\delta & 0 \\ \sin\delta & \cos\delta & 0 \\ 0 & 0 & 1 \end{bmatrix} \cdot \begin{bmatrix} \cos\beta & 0 & \sin\beta \\ 0 & 1 & 0 \\ -\sin\beta & 0 & \cos\beta \end{bmatrix} \cdot \begin{bmatrix} 1 & 0 & 0 \\ 0 & \cos\alpha & -\sin\alpha \\ 0 & \sin\alpha & \cos\alpha \end{bmatrix} \cdot \begin{bmatrix} X^A \\ Y^A \\ Z^A \end{bmatrix}$$

The next step is to convert from the scanner presumed installation to the aircraft frame. The transforms are identical to those already derived, but instead of using the aircraft attitude parameters of heading ($\delta$), pitch ($\beta$), and roll ($\alpha$) from the INS/GPS, the presumed lidar installation angles of azimuth ($\delta$), elevation ($\beta$), and roll ($\alpha$) provided by the user are applied. This transform is expressed as:

$$R_{Scan}^{Aircraft} = \begin{bmatrix} X^A \\ Y^A \\ Z^A \end{bmatrix} =$$ (Eq. 25)

$$\begin{bmatrix} \cos\delta & -\sin\delta & 0 \\ \sin\delta & \cos\delta & 0 \\ 0 & 0 & 1 \end{bmatrix} \cdot \begin{bmatrix} \cos\beta & 0 & \sin\beta \\ 0 & 1 & 0 \\ -\sin\beta & 0 & \cos\beta \end{bmatrix} \cdot \begin{bmatrix} 1 & 0 & 0 \\ 0 & \cos\alpha & -\sin\alpha \\ 0 & \sin\alpha & \cos\alpha \end{bmatrix} \cdot \begin{bmatrix} X^S \\ Y^S \\ Z^S \end{bmatrix}$$

Figure 11:
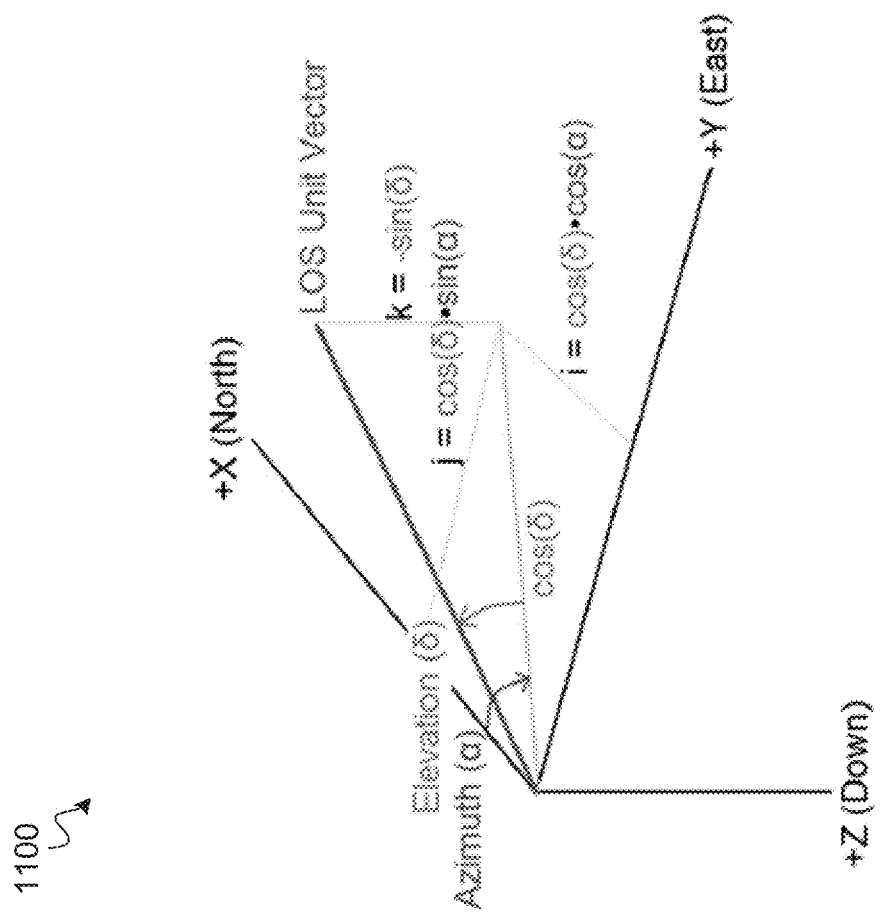
FIG. 11 is a schematic diagram illustrating an example of a framework for derivation of a line-of-sight (LOS) matrix in a 3-D lidar installation angles determination, according to certain aspects of the disclosure.

FIG. 11 is a schematic diagram illustrating an example of a framework 1100 for derivation of a line-of-sight (LOS) matrix in a 3-D lidar installation angles determination, according to certain aspects of the disclosure. The final matrix, the unknown [$LOS^{scan}$] matrix, which is given in the scan coordinate frame, incorporates the two unknowns: azimuth ($\alpha$) and elevation ($\delta$), as shown in the framework 11 of FIG. 11. The subject solution provides the left side of the following expression:

$$\begin{bmatrix} X^S \\ Y^S \\ Z^S \end{bmatrix} = [LOS^{Scan}] = \begin{bmatrix} \cos\delta\cos\alpha \\ \cos\delta\sin\alpha \\ -\sin\delta \end{bmatrix}$$ (Eq. 26)

The equation derivation presented herein has been shown to be an accurate tool in the system to measure the actual lidar installation angles on an airborne platform. One problem that may arise that is not addressed by the previous derivations, however, is the inconsistency of the timestamps of the INS/GPS and the lidar, as they are separate systems. This problem can be easily rectified, however, using data created with the equations derived in the previous sections. If the calibration data is collected on an aircraft in turning flight, the winds aloft will impart a varying aircraft motion as the winds change from headwinds to crosswinds to tailwinds and back to crosswinds. If one were to plot the lidar ground return radial velocity and the aircraft motion projected onto the LOS, a sine-wave pattern would be noted. If a time shift is present in the data, then the two sine waves will be slightly out of phase with each other.

The phase difference is correlated directly with the time shift and can easily be measured using a cross-correlation method. Once the time shift is known, the incorrect dataset (from INS/GPS or lidar) can be shifted appropriately and the methods developed in the previous sections can be rerun to generate the most accurate installation angles possible. If the clocks of both the INS/GPS and the lidar are synchronized to the same source (e.g., the INS/GPS itself), then this section does not apply, and the cross-correlation is not needed.

In summary, the airborne system of the subject technology couples an onboard INS/GPS sensor, a Doppler lidar system, and an analysis processor (computer) to measure the precise installation angles of the lidar system on the aircraft. Knowing the precise installation angles allows for the most accurate computation of wind profiles by the system and eliminates the need for ground returns in collected data. The system uses measurements made by the INS/GPS and the lidar and processes the data of each with linear algebra to determine, with a high accuracy, the installation angles of the lidar system on the aircraft. The system has been demonstrated with real flight data.

FIG. 12 is a flow diagram illustrating an example method 1200 of lidar installation angles determination, according to certain aspects of the disclosure. The method 1200 includes measuring data associated with wind velocity and ground returns using a lidar apparatus (e.g., 122 of FIG. 1) installed on an airborne platform (e.g., 120 of FIG. 1) performing a test flight in an orbit (e.g., 110 of FIG. 1) (1210). The method further includes measuring, by a navigation system (e.g., 124 of FIG. 1) on board the airborne platform, motion data associated with movements of the airborne platform and generating a navigation signal (1220). A processor is used to determine, in real time, one or more installation angles of the lidar apparatus on the airborne platform to improve accuracy of the data associated with wind velocity (1230).

Figure 13:
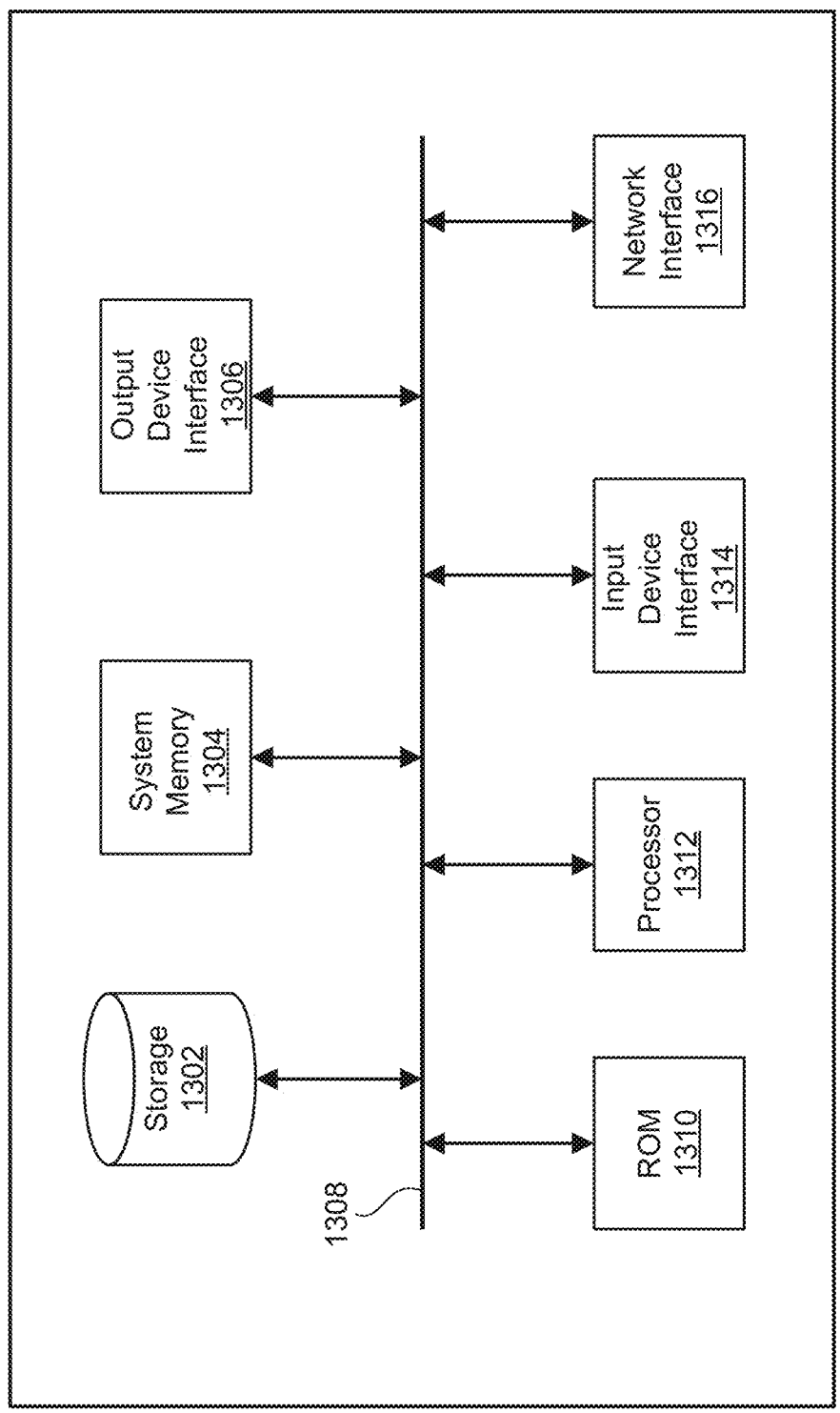
FIG. 13 conceptually illustrates an electronic system with which some aspects of the subject technology are implemented.

FIG. 13 conceptually illustrates an electronic system with which some aspects of the subject technology are implemented. Electronic system 1300, for example, can be a desktop computer, a laptop computer, a tablet computer, a server or any device that can control and/or perform processing of data including aggregation of data, or generally any electronic device that transmits signals over a network. Such an electronic system includes various types of computer-readable media and interfaces for various other types of computer-readable media. Electronic system 1300 includes bus 1308, processing unit(s) 1312, system memory 1304, read-only memory (ROM) 1310, permanent storage device 1302, input device interface 1314, output device interface 1306, and network interface 1316, or subsets and variations thereof.

Bus 1308 collectively represents all system, peripheral, and chipset buses that communicatively connect the numerous internal devices of electronic system 1300. In one or more implementations, bus 1308 communicatively connects processing unit(s) 1312 with ROM 1310, system memory 1304, and permanent storage device 1302. From these various memory units, processing unit(s) 1312 retrieve(s) instructions to execute and data to process in order to execute the processes of the subject disclosure. The processing unit(s) 1312 can be a single processor or a multicore processor in different implementations. In one or more implementations, the processing unit(s) 1312 can perform any processing and computations with respect to determination of the lidar installation angles and the time shifts between the INS/GPS and lidar systems, as discussed above.

ROM 1310 stores static data and instructions that are needed by processing unit(s) 1312 and other modules of the electronic system. Permanent storage device 1302, on the other hand, is a read-and-write memory device. This device is a nonvolatile memory unit that stores instructions and data even when electronic system 1300 is off. One or more implementations of the subject disclosure use a mass-storage device (such as a magnetic or optical disk and its corresponding disk drive) as permanent storage device 1302.

Other implementations use a removable storage device (such as a floppy disk or flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such as random access memory (RAM). System memory 1304 stores any of the instructions and data that processing unit(s) 1312 need(s) at runtime. In one or more implementations, the processes of the subject disclosure are stored in system memory 1304, permanent storage device 1302, and/or ROM 1310. From these various memory units, processing unit(s) 1312 retrieve(s) instructions to execute and data to process in order to execute the processes of one or more implementations.

Bus 1308 also connects to input and output device interfaces 1314 and 1306. Input device interface 1314 enables a user to communicate information and select commands to the electronic system. Input devices used with input device interface 1314 include, for example, alphanumeric keyboards and pointing devices (also called "cursor control devices"). Output device interface 1306 enables, for example, the display of images generated by electronic system 1300. Output devices used with output device interface 1306 include, for example, printers and display devices such as a liquid crystal display (LCD), a light-emitting diode (LED) display, an organic light-emitting diode (OLED) display, a flexible display, a flat-panel display, a solid-state display, a projector, or any other device for outputting information. One or more implementations may include devices that function as both input and output devices, such as touchscreens. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 13, bus 1308 also couples electronic system 1300 to a network (not shown) through network interface 1316. In this manner, the computer can be a part of a network of computers (such as a local area network (LAN), a wide area network (WAN), or an Intranet, or a network of networks, such as the Internet). Any or all components of electronic system 1300 can be used in conjunction with the subject disclosure.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing units (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards), magnetic and/or solid-state hard drives, ultra-density optical discs, any other optical or magnetic media, and floppy disks. In one or more implementations, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more implementations, the computer-readable media is nontransitory computer-readable media, computer-readable storage media, or nontransitory computer-readable storage media.

In one or more implementations, a computer program product (also known as a program, software, software application, script, or code) can be written in any form of programming language, including compiled or interpreted languages, or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

While the above discussion primarily refers to microprocessor or multicore processors that execute software, one or more implementations are performed by one or more integrated circuits, such as application-specific integrated circuits (ASICs) or field-programmable gate arrays (FPGAs). In one or more implementations, such integrated circuits execute instructions that are stored on the circuit itself.

In some aspects, the subject technology is related to photonic integrated circuits, and more particularly to megapixel-resolution PIC-based imagers. In some aspects, the subject technology may be used in various markets, including, for example, and without limitation, sensor technology and exploitation markets.

Those of skill in the art would appreciate that the various illustrative blocks, modules, elements, components, methods, and algorithms described herein may be implemented as electronic hardware, computer software, or a combination of both. To illustrate this interchangeability of hardware and software, various illustrative blocks, modules, elements, components, methods, and algorithms have been described above generally in terms of their functionalities. Whether such a functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended on the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patents or other documents that may be incorporated herein by reference, the definition that is consistent with this specification should be adopted.

What is claimed is:

1. A system comprising:
   an airborne platform configured to perform a test flight in an orbit;
   a light detection and ranging (lidar) apparatus installed on the airborne platform for wind-velocity measurement;
   a navigation system on board the airborne platform and configured to measure motion data associated with movements of the airborne platform and to generate a navigation signal; and
   a processor configured to i) determine in real time one or more installation angles of the lidar apparatus on the airborne platform and ii) perform a cross-correlation between a lidar ground return signal and the navigation signal to determine a time offset between the lidar ground return signal and the navigation signal, wherein the wind-velocity measurement is based on the one or more installation angles and the time offset.

2. The system of claim 1, wherein the airborne platform comprises an aircraft configured to perform a turning test flight to provide cloud-free lidar data with a lidar beam configured to intersect ground.

3. The system of claim 2, wherein the processor is configured to determine components of aircraft motion projected on the lidar beam based on the one or more installation angles of the lidar apparatus for an entire test flight.

4. The system of claim 1, wherein the navigation system comprises at least one of an inertial navigation system (INS) or a global positioning system (GPS).

5. The system of claim 1, wherein clock generators of the navigation system and the lidar apparatus are not synchronized.

6. The system of claim 1, wherein the processor is configured to make corrective shifts in the lidar ground return signal or the navigation signal based on the time offset.

7. The system of claim 1, wherein the lidar apparatus comprises a Doppler lidar system and is in communication with the processor.

8. The system of claim 1, wherein the processor is configured to determine the one or more installation angles of the lidar apparatus by using a matrix approach to solve a linear algebraic equation in a three-dimensional space.

9. The system of claim 8, wherein the linear algebraic equation defines a relation between the measured motion data, line-of-sight (LOS) data, and ground velocity data.

10. The system of claim 9, wherein the LOS data is associated with a plurality of beams of the lidar apparatus, and wherein the ground velocity data comprises ground radial velocities along LOSs of the plurality of beams of the lidar apparatus.

11. A method comprising:
measuring data associated with wind velocity using a light detection and ranging (lidar) apparatus installed on an airborne platform performing a test flight in an orbit;
measuring, by a navigation system on board the airborne platform, motion data associated with movements of the airborne platform and generating a navigation signal;
determining, by a processor in real time, one or more installation angles of the lidar apparatus on the airborne platform;
performing, by the processor, a cross-correlation between a lidar ground return signal and the navigation signal to determine a time offset between the lidar ground return signal and the navigation signal; and
calculating, by the processor, the wind velocity based on the one or more installation angles and the time offset.

12. The method of claim 11, further comprising determining, by the processor, components of aircraft motion projected on a lidar beam based on the determined one or more installation angles of the lidar apparatus for an entire test flight.

13. The method of claim 11, wherein clock generators of the navigation system and the lidar apparatus are not synchronized.

14. The method of claim 11, further comprises making corrective shifts, by the processor, in the lidar ground return signal or the navigation signal based on the time offset.

15. The method of claim 11, further comprises determining, by the processor, the one or more installation angles of the lidar apparatus by using a matrix approach to solve a linear algebraic equation in a three-dimensional space.

16. The method of claim 15, wherein the linear algebraic equation defines a relation between the motion data, LOS data, and ground velocity data.

17. The method of claim 16, wherein the LOS data is associated with a plurality of beams of the lidar apparatus, and wherein the ground velocity data comprises ground radial velocities along LOSs of the plurality of beams of the lidar apparatus.

18. The method of claim 11, wherein the airborne platform comprises an aircraft performing a turning test flight to provide cloud-free lidar data with a lidar beam intersecting ground, and wherein the navigation system comprises at least one of an INS or GPS.

19. An airborne platform comprising:
a Doppler lidar apparatus configured to facilitate a wind-velocity measurement;
a navigation system configured to measure motion data associated with movements of the airborne platform and to generate a navigation signal; and
a processor in communication with the Doppler lidar apparatus, the processor configured to:
determine in real time one or more installation angles of the Doppler lidar apparatus;
calculate the wind-velocity measurement based on at least the one or more installation angles, and
determine components of aircraft motions projected on a lidar beam based on the one or more installation angles for an entire test flight.

20. The airborne platform of claim 19, wherein clock generators of the navigation system and the Doppler lidar apparatus are not synchronized, and wherein the processor is configured to perform a cross-correlation between a lidar ground return signal and the navigation signal to determine a time offset between the lidar ground return signal and the navigation signal, and to make corrective shifts in the lidar ground return signal or the navigation signal based on the time offset.

* * * * *